(12) United States Patent
Luo et al.

(10) Patent No.: US 8,891,462 B2
(45) Date of Patent: Nov. 18, 2014

(54) METHODS AND APPARATUSES FOR DOWNLINK CHANNEL RESOURCE ASSIGNMENT

(75) Inventors: Xiliang Luo, Northridge, CA (US); Peter Gaal, San Diego, CA (US); Wanshi Chen, San Diego, CA (US); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 233 days.

(21) Appl. No.: 13/106,643

(22) Filed: May 12, 2011

(65) Prior Publication Data

US 2012/0120882 A1    May 17, 2012

Related U.S. Application Data

(60) Provisional application No. 61/334,910, filed on May 14, 2010.

(51) Int. Cl.
*H04W 4/00* (2009.01)
*H04L 5/00* (2006.01)

(52) U.S. Cl.
CPC ................... *H04L 5/0053* (2013.01)
USPC .......................................... 370/329

(58) Field of Classification Search
USPC .......................................... 370/329
See application file for complete search history.

(56) References Cited

U.S. PATENT DOCUMENTS

2009/0245187 A1   10/2009   Nam et al.

| 2011/0051824 A1* | 3/2011 | Kim et al. ..................... 375/259 |
| 2011/0170499 A1* | 7/2011 | Nayeb Nazar et al. ....... 370/329 |
| 2011/0176502 A1* | 7/2011 | Chung et al. ................. 370/329 |

FOREIGN PATENT DOCUMENTS

WO    WO-2010011083 A2    1/2010

OTHER PUBLICATIONS

Alcatel-Lucent et al: "PHICH resource allocation in LTE-A", 3GPP Draft; R1-101848 PHICH Final, 3rd Generation Partnership Project (3GPP), Mobile Competence Centre ; 650, Route Des Lucioles ; F-06921 Sophia-Antipolis CEDEX ; France, vol. RAN WGI, no. Beijing, china; Apr. 12, 2010, Apr. 6, 2010, XP050419225, [retrieved on Apr. 6, 2010].
Alcatel-Lucent Shanghai Bell et al: Cyclic Shift Mapping of PHICH Resources for UL MIMO, 3GPP Draft; R1-102796, 3rd Generation Partnership Project (3GPP), Mobile Competence Centre; 650, Route Des Lucioles; F-06921 Sophia-Antipolis CEDEX; France, vol. RAN WG1, no. Montreal, Canada; May 10, 2010, May 4, 2010, XP050419968, [retrieved on May 4, 2010].
International Search Report and Written Opinion—PCT/US2011/036478, ISA/EPO—Oct. 6, 2011.

(Continued)

*Primary Examiner* — Noel Beharry
(74) *Attorney, Agent, or Firm* — Liem T. Do

(57) ABSTRACT

Certain aspects of the present disclosure provide techniques for determining resources for transmission of acknowledgement messages to a user equipment (UE). The techniques involve receiving a plurality of codewords from the UE via an uplink component carrier, and determining at least first and second index pairs identifying resources of a downlink channel to be used for transmitting acknowledgement messages for the received codewords. The first index pair is determined based on a first set of parameters, and the second index pair is determined based on the first set of parameters and a second set of one or more parameters. At least one of the parameters in the second set is a fixed value.

40 Claims, 6 Drawing Sheets

(56) References Cited

OTHER PUBLICATIONS

LG Electronics: "PHICH resource assignment for UL SU-MIMO in LTE-A", 3GPP Draft; R1-102729 LG PHICH, 3rd Generation Partnership Project (3GPP), Mobile Competence Centre ; 650, Route Des Lucioles ; F-06921 Sophia-Antipolis CEDEX ; France, vol. RAN WGI, no. Montreal, Canada; May 10, 2010, May 4, 2010, XP050419931, [retrieved on May 4, 2010].

Nokia Siemens Networks et al: "PHICH mapping for UL SU-MIMO", 3GPP Draft; R1-103192, 3rd Generation Partnership Project (3GPP), Mobile Competence Centre ; 650, Route Des Lucioles ; F-06921 Sophia-Antipolis CEDEX ; France, vol. RAN WGI, no. Montreal, Canada; May 10, 2010, May 5, 2010, XP050420342, [retrieved on May 5, 2010].

NTT DoCoMo: "PHICH for SU-MIMO", 3GPP Draft; R1-103244 PHICH SU-MIMO, 3rd Generation Partnership Project (3GPP), Mobile Competence Centre ; 650, Route Des Lucioles ; F-06921 Sophia-Antipolis CEDEX ; France, vol. RAN WGI, no. Montreal, Canada; May 10, 2010, May 4, 2010, XP050420274, [retrieved on May 4, 2010].

Samsung: "PHICH Resource Indexing with UL CA", 3GPP Draft; R1-102165 PHICH, 3rd Generation Partnership Project (3GPP), Mobile Competence Centre ; 650, Route Des Lucioles ; F-06921 Sophia-Antipolis CEDEX; France, vol. RAN WGI, no. Beijing, china; Apr 12, 2010, Apr. 6, 2010, XP050419451, [retrieved on Apr. 6, 2010].

\* cited by examiner

METHODS AND APPARATUSES FOR DOWNLINK CHANNEL RESOURCE ASSIGNMENT

CROSS REFERENCE TO RELATED APPLICATIONS

The present Application for Patent claims priority to U.S. Provisional Application No. 61/334,910, entitled, "HARQ Channel Resource Assignment," filed May 14, 2010, and assigned to the assignee hereof and hereby expressly incorporated by reference herein.

TECHNICAL FIELD

Certain aspects of the present disclosure generally relate to wireless communications and, more particularly, to assigning channel resources to downlink transmissions.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems, and Orthogonal Frequency Division Multiple Access (OFDMA) systems.

Generally, a wireless multiple-access communication system can simultaneously support communication for multiple terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

SUMMARY

Certain aspects of the present disclosure provide a method for wireless communications. The method includes receiving a plurality of codewords from a user equipment (UE) via an uplink component carrier, and determining at least first and second index pairs identifying resources of a downlink channel to use for transmitting acknowledgement messages for the received codewords. The first index pair is determined based on a first set of parameters, and the second index pair is determined based on the first set of parameters and a second set of one or more parameters. At least one of the parameters in the second set of one or more parameters is a fixed value.

Certain aspects of the present disclosure provide a method for wireless communications. The method includes transmitting a plurality of codewords to a base station via an uplink component carrier, and determining at least first and second index pairs identifying resources of a downlink channel to use for receiving acknowledgement messages for the transmitted codewords. The first index pair is determined based on a first set of parameters, and the second index pair is determined based on the first set of parameters and a second set of one or more parameters. At least one of the parameters in the second set of one or more parameters is a fixed value.

Certain aspects of the present disclosure provide an apparatus for wireless communications. The apparatus includes means for receiving a plurality of codewords from a user equipment (UE) via an uplink component carrier and means for determining at least first and second index pairs identifying resources of a downlink channel to use for transmitting acknowledgement messages for the received codewords. The first index pair is determined based on a first set of parameters, and the second index pair is determined based on the first set of parameters and a second set of one or more parameters. At least one of the parameters in the second set of one or more parameters is a fixed value.

Certain aspects of the present disclosure provide an apparatus for wireless communications. The apparatus includes means for transmitting a plurality of codewords to a base station via an uplink component carrier and means for determining at least first and second index pairs identifying resources of a downlink channel to use for receiving acknowledgement messages for the transmitted codewords. The first index pair is determined based on a first set of parameters, and the second index pair is determined based on the first set of parameters and a second set of one or more parameters. At least one of the parameters in the second set of one or more parameters is a fixed value.

Certain aspects of the present disclosure provide an apparatus for wireless communications. The apparatus includes at least one processor configured to receive a plurality of codewords from a user equipment (UE) via an uplink component carrier and to determine at least first and second index pairs identifying resources of a downlink channel to use for transmitting acknowledgement messages for the received codewords. The first index pair is determined based on a first set of parameters, and the second index pair is determined based on the first set of parameters and a second set of one or more parameters. At least one of the parameters in the second set of one or more parameters is a fixed value. The apparatus further includes memory coupled with the at least one processor.

Certain aspects of the present disclosure provide an apparatus for wireless communications. The apparatus includes at least one processor configured to transmit a plurality of codewords to a base station via an uplink component carrier and to determine at least first and second index pairs identifying resources of a downlink channel to use for receiving acknowledgement messages for the transmitted codewords. The first index pair is determined based on a first set of parameters, and the second index pair is determined based on the first set of parameters and a second set of one or more parameters. At least one of the parameters in the second set of one or more parameters is a fixed value. The apparatus further includes memory coupled with the at least one processor.

Certain aspects of the present disclosure provide a computer program product comprising a computer readable storage medium having instructions for wireless communications stored thereon. The instructions include instructions for causing a computer to receive a plurality of codewords from a user equipment (UE) via an uplink component carrier and to determine at least first and second index pairs identifying resources of a downlink channel to use for transmitting acknowledgement messages for the received codewords. The first index pair is determined based on a first set of parameters, and the second index pair is determined based on the first set of parameters and a second set of one or more parameters. At least one of the parameters in the second set of one or more parameters is a fixed value.

Certain aspects of the present disclosure provide a computer program product comprising a computer readable storage medium having instructions for wireless communications stored thereon. The instructions include instructions for causing a computer to transmit a plurality of codewords to a base station via an uplink component carrier and to determine at least first and second index pairs identifying resources of a downlink channel to use for receiving acknowledgement messages for the transmitted codewords. The first index pair is determined based on a first set of parameters, and the second index pair is determined based on the first set of parameters and a second set of one or more parameters. At least one of the parameters in the second set of one or more parameters is a fixed value

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
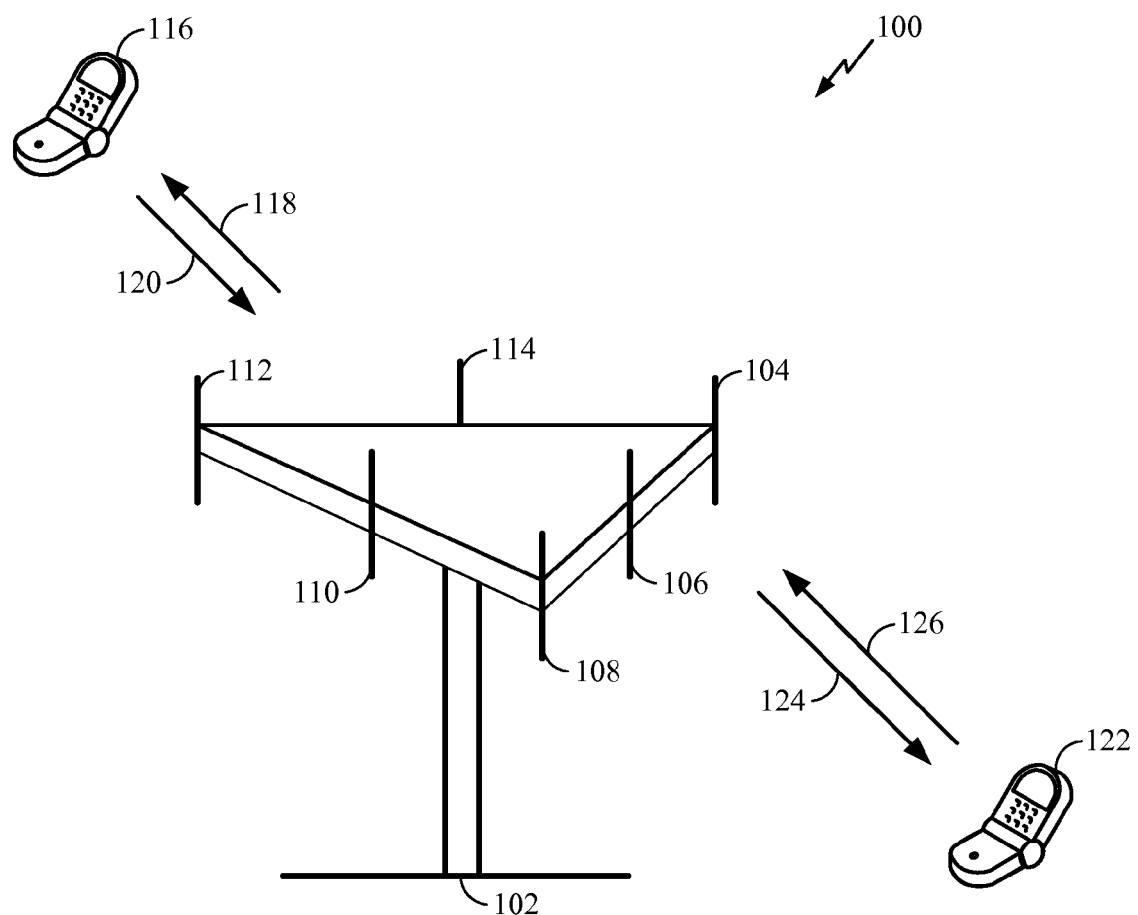
FIG. 1 illustrates a multiple access wireless communication system in accordance with certain aspects of the present disclosure.

Certain aspects of the present disclosure propose methods for determining resources for transmission of acknowledgement messages to a user equipment (UE) in a physical hybrid automatic repeat request (HARQ) indicator channel (PHICH). The proposed methods include receiving a plurality of codewords from the user equipment via an uplink component carrier, and determining index pairs identifying resources of a PHICH channel to be used for transmitting acknowledgement messages for the received codewords. The index pairs may be determined based on two sets of parameters that may be fixed. The two sets of parameters may also be derived from the parameters that are already known at the UE, or may be signaled semi-statistically or dynamically to the UE.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2).

Single carrier frequency division multiple access (SC-FDMA) utilizes single carrier modulation at a transmitter side and frequency domain equalization at a receiver side. The SC-FDMA signal has lower peak-to-average power ratio (PAPR) because of its inherent single carrier structure. The SC-FDMA has drawn great attention, especially in the uplink where lower PAPR greatly benefits the UE in terms of transmit power efficiency. It is currently used for the uplink multiple access scheme in LTE.

An access point ("AP") may include a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may include a subscriber station, a subscriber unit, a mobile station, a remote station, a remote terminal, a user terminal, a user agent, a user device, user equipment, a user station, or some other terminology. In some implementations, an access terminal may include a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a tablet), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

Referring to FIG. 1, a multiple access wireless communication system according to one aspect is illustrated. An access point 100 may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In one aspect of the present disclosure, each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

Figure 2:
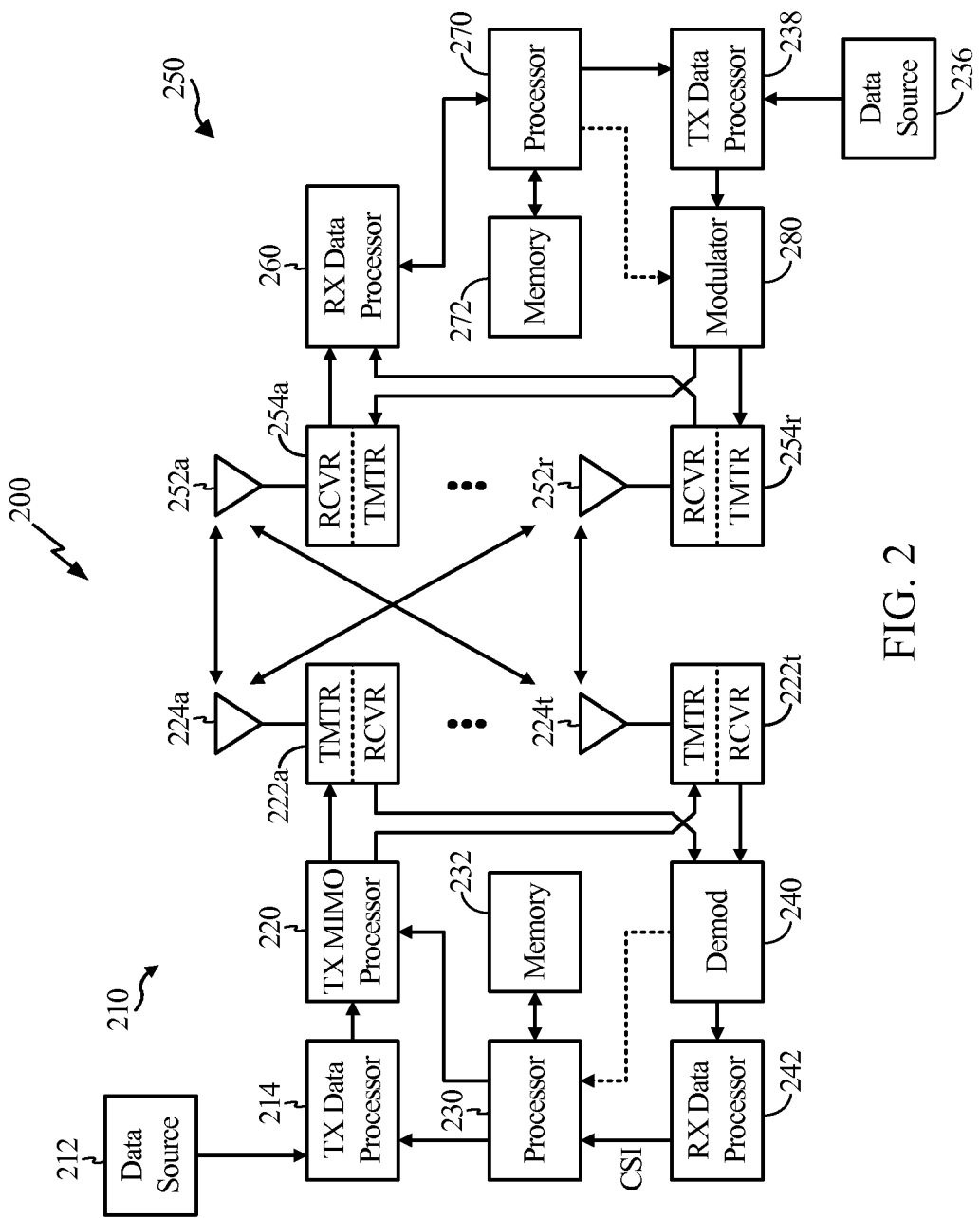
FIG. 2 illustrates a block diagram of an access point and a user equipment in accordance with certain aspects of the present disclosure.

FIG. 2 illustrates a block diagram of an aspect of a transmitter system 210 (e.g., access point) and a receiver system 250 (e.g., access terminal) in a MIMO system 200. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., binary phase shift keying (BPSK), Quadrature phase shift keying (QPSK), M-PSK, or M-QAM) selected for that data stream to provide modulation symbols. The data rate, coding, and modulation for each data stream may be determined by instructions stored in memory 232 and performed by processor 230. Processor 230, processor 214, and/or other processors and modules at the transmitter system 210 may perform or direct operations in FIG. 5 and/or other operations for the techniques described herein.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion using instructions stored in memory 272. The reverse link message may include various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210. Processor 270, processor 260, and/or other processors and modules at the receiver system 250 may perform or direct operations in FIG. 6 and/or other operations for the techniques described herein.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

LTE utilizes OFDM on the downlink and SC-FDM on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal fast Fourier transform (FFT) size may be equal to 128, 256, 512, 1024 or 2048 for system bandwidth of 1.25, 2.5, 5, 10 or 20 MHz, respectively. The system bandwidth may also be partitioned into subbands. For example, a subband may cover 1.08 MHz (e.g., 6 resource blocks), and there may be 1, 2, 4, 8 or 16 subbands for system bandwidth of 1.25, 2.5, 5, 10 or 20 MHz, respectively.

Figure 3:
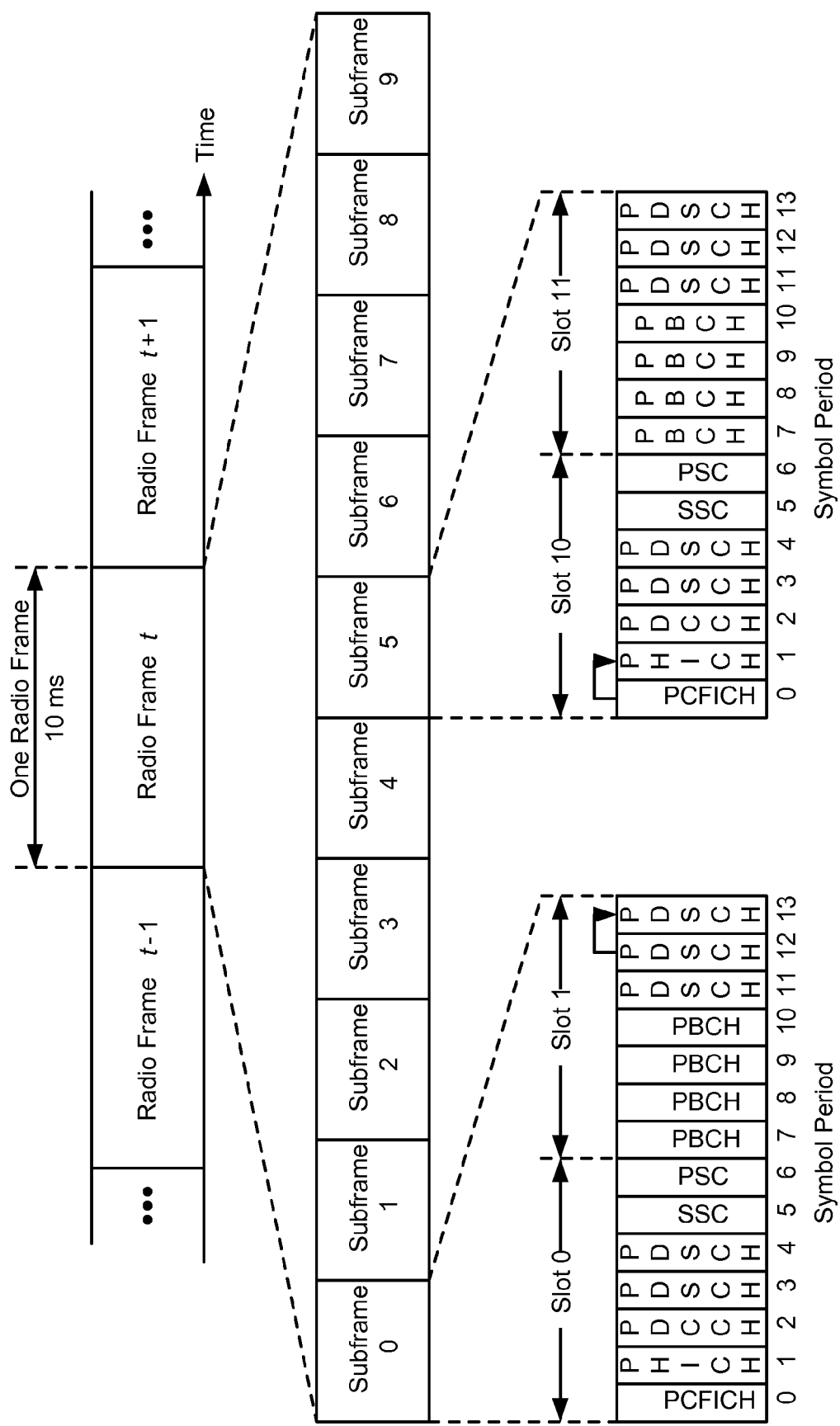
FIG. 3 is a block diagram conceptually illustrating a downlink frame structure in a telecommunications system.

FIG. 3 shows an example downlink frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 3) or 14 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSS) and a secondary synchronization signal (SSS) for each cell in the eNodeB. The primary and secondary synchronization signals may be sent in symbol periods 6 and 5, respectively, in each of subframes 0 and 5 of each radio frame with the normal cyclic prefix, as shown in FIG. 3. The synchronization signals may be used by UEs for cell detection and acquisition. The eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in only a portion of the first symbol period of each subframe, although depicted in the entire first symbol period in FIG. 3. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 3, M=3. The eNodeB may send a Physical HARQ Indicator Channel (PHICH) and a Physical Downlink Control Channel (PDCCH) in the first M symbol periods of each subframe (M=3 in FIG. 3). The PHICH may carry information to support hybrid automatic retransmission (HARQ). The PDCCH may carry information on uplink and downlink resource allocation for UEs and power control information for uplink channels. Although not shown in the first symbol period in FIG. 3, it is understood that the PDCCH and PHICH are also included in the first symbol period. Similarly, the PHICH and PDCCH are also both in the second and third symbol periods, although not shown that way in FIG. 3. The eNodeB may send a Physical Downlink Shared Channel (PDSCH) in the remaining symbol periods of each subframe. The PDSCH may carry data for UEs scheduled for data transmission on the downlink.

The eNodeB may send the PSS, SSS and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Certain aspects of the present disclosure provide techniques for determining resources to be used for acknowledging data transmissions. As will be described herein, the techniques may involve an eNodeB and a UE configured to identify resources of a downlink channel to use for communicating acknowledgement messages corresponding to received messages. As an example, certain techniques described herein may be applied to determine downlink resources of a PHICH to be used for sending hybrid automatic repeat request (HARQ)-acknowledgement (ACK) messages to acknowledge correct reception of uplink data transmissions.

As noted above, PHICH is a downlink physical channel which carries the HARQ ACK/NACK information indicating whether the eNodeB has correctly received a transmission on the PUSCH. Multiple PHICHs (for different UEs) may be mapped to the same set of downlink resource elements. These constitute a PHICH group, where different PHICHs within the same PHICH group are separated through different complex orthogonal sequences.

According to certain aspects, an eNodeB and a UE may communicate one or more sets of parameters that may be used to determine resources for transmission of acknowledgements. In other words, using the parameters, the eNodeB may know what resources to use to send acknowledgement messages to the UE (acknowledging receipt of uplink transmissions), while the UE will know what resources to monitor for those acknowledgment messages.

According to certain aspects, these parameters may be fixed or may be efficiently signaled (e.g., using relatively small amount of over the air resources). For example, according to certain aspects, the eNodeB and the UE may identify resources to be used for simultaneous transmission of acknowledgement messages over two PHICHs using two index pairs. According to certain aspects, each index pair may includes a number of a channel group and a sequence index within the channel group. The channel group number and sequence index for one of the index pairs may be determined based on a first set of parameters.

As an example, the channel group number and the sequence index for the first index pair may be determined according to LTE Rel-8 specifications to be able to support legacy devices. The channel group number and sequence index for the second index pair may be determined based on the first set of parameters and a second set of one or more parameters. Thus, only the second set of one or more parameters that may be used to determine the second index pair may represent additional overhead compared to the conventional systems. It should be noted that the PHICH resources may be allocated so that probability of collision in the allocated channels is very small or zero.

Figure 4:
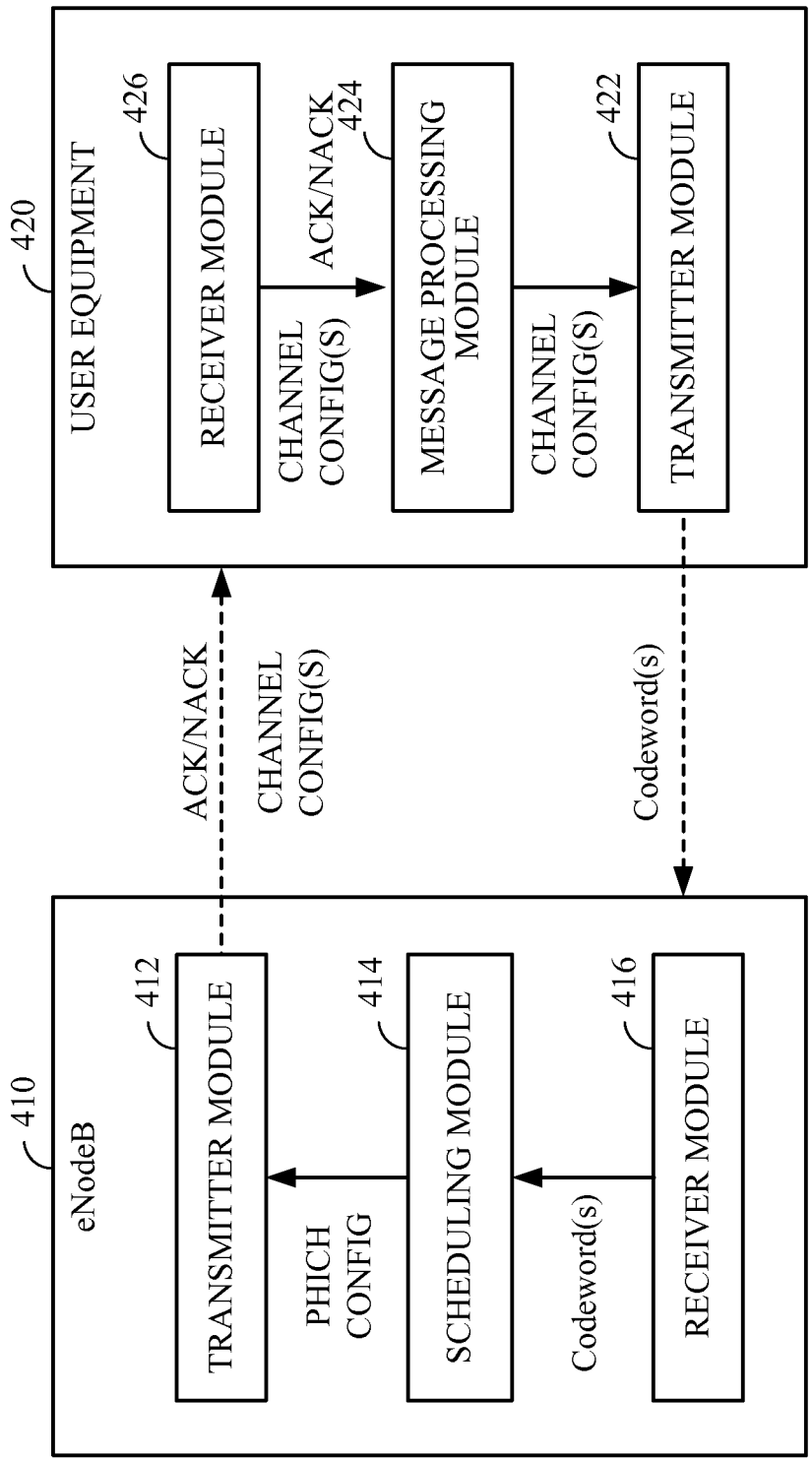
FIG. 4 is a block diagram conceptually illustrating an operation of an eNodeB with a user equipment, in accordance with certain aspects of the present disclosure.

FIG. 4 illustrates an example wireless system 400 with an eNodeB 410 and UE 420 capable of performing operations described herein. According to certain aspects, the eNodeB 410 may receive, via a receiver module 416, a plurality of codewords from the UE 420. The eNodeB may process the codewords (e.g., detect, decode) using a processing module (not shown) and generate hybrid automatic repeat request (HARQ) acknowledgements (ACK) negative acknowledgement (NACK) messages to transmit to the UE.

The eNodeB 410 may also include a scheduling module 414. The scheduling module 414 may be generally configured to determine resources to be used to transmit ACK/NACK messages to the UE. The scheduling module 414 may also determine other channel configuration parameters to be used by the UE. As illustrated, this information may be provided to a transmitter module 412, to be transmitted to the UE 420. The eNodeB may also transmit ACK/NACK messages to the UE corresponding to the received codewords.

The UE 420 may receive the configuration information and ACK/NACK messages, via a receiver module 426, and provide the information to a message processing module 424. The message processing module may utilize the received information, for example, to determine the resources that are used for transmission of ACK/NACK messages, and whether or not a re-transmission of the HARQ messages is necessary. The UE may also extract PUSCH parameters for transmission of codewords to the eNodeB. The UE 420 may send codewords (via a transmitter module 422) on the assigned PUSCH.

Regarding physical hybrid indicator channel (PHICH) assignment according to certain specifications, such as those defined in LTE Rel-8, a PHICH resource for the corresponding scheduled physical uplink shared channel (PUSCH) transmission may be identified by an index pair ($n_{PHICH}^{group}$, $n_{PHICH}^{seq}$), where the PHICH group number $n_{PHICH}^{group}$ may be defined as follows:

$$n_{PHICH}^{group} = (I_{PRB\_RA}^{lowest\_index} + n_{DMRS}) \mod N_{PHICH}^{group} + I_{PHICH} N_{PHICH}^{group}.$$

The orthogonal sequence index $n_{PHICH}^{seq}$ within the PHICH group may be defined as follows:

$$n_{PHICH}^{seq} = (\lfloor I_{PRB\_RA}^{lowest\_index} / N_{PHICH}^{group} \rfloor + n_{DMRS}) \mod 2N_{SF}^{PHICH}.$$

In the above equations, $n_{DMRS}$ may represent a value mapped from the cyclic shift for demodulation reference signal (DMRS) field in the corresponding downlink control information (DCI) format (e.g., DCI format 0 in LTE Rel-8), $N_{SF}^{PHICH}$ may represent size of the spreading factor used for PHICH modulation, $I_{PRB\_RA}^{lowest\_index}$ may represent the lowest index of physical resource blocks (PRBs) in the first slot of a corresponding PUSCH transmission, $N_{PHICH}^{group}$ may represent number of PHICH groups, and $I_{PHICH}$ may be equal to one for time division duplex (TDD) uplink and downlink configuration 0 with PUSCH transmission in subframes 4 and 9, and $I_{PHICH}$ may be equal to zero for other configurations. In addition, a mod b may represent remainder of division of a by b, and $\lfloor . \rfloor$ may represent a 'floor' operator.

Certain aspects of the present disclosure provide techniques that may be used to determine PHICH resource assignment. In some scenarios, spatial multiplexing of up to four transmission layers may be supported. A user equipment may transmit up to two codewords or transport blocks in a subframe per uplink component carrier. Each of the codewords may be mapped onto one or two transmission layers according to the same principle as in LTE Rel-8 downlink spatial multiplexing.

When a PUSCH transmission contains two codewords, two hybrid automatic repeat request acknowledgements (HARQ-ACKs) may be fed back on two PHICH resources to acknowledge receipt of each codeword.

For certain aspects, in order to support legacy devices, the first PHICH resource for one of the HARQ-ACKs can be determined in the same way as described in LTE Rel-8, and the second PHICH resource for the second HARQ-ACK message may be derived as described below. Therefore, a group number $n_{PHICH}^{group}$ for the first PHICH may be defined as follows:

$$n_{PHICH}^{group} = (I_{PRB\_RA}^{lowest\_index} + n_{DMRS}) \mod N_{PHICH}^{group} + I_{PHICH} N_{PHICH}^{group}.$$

The orthogonal sequence index $n_{PHICH}^{seq}$ within the PHICH group for the first PHICH may be defined as follows:

$$n_{PHICH}^{seq} = (\lfloor I_{PRB\_RA}^{lowest\_index} / N_{PHICH}^{group} \rfloor + n_{DMRS}) \bmod 2 N_{SF}^{PHICH}.$$

For certain aspects, a group number for the second PHICH for transmission of the second HARQ-ACK message may be derived as follows:

$$n_{PHICH}^{group} = ((I_{PRB\_RA}^{lowest\_index} + \Delta_1) + (n_{DMRS} + \Delta_2)) \bmod N_{PHICH}^{group} + I_{PHICH} N_{PHICH}^{group}$$

For certain aspects, an orthogonal sequence index within the PHICH group for transmission of the second HARQ-ACK message may be defined as follows:

$$n_{PHICH}^{seq} = (\lfloor (I_{PRB\_RA}^{lowest\_index} + \Delta_1) / N_{PHICH}^{group} \rfloor + (n_{DMRS} + \Delta_2)) \bmod 2 N_{SF}^{PHICH}$$

For certain aspects of the present disclosure, values of either $\Delta_1$ or $\Delta_2$, or both in the above equations may be fixed in order to reduce signaling effort. It should be noted when both $\Delta_1$ and $\Delta_2$ are fixed, there may not be a need for signaling those fixed values. For example, values for $\Delta_1$ and $\Delta_2$ may be stored in the memories of eNodeB and the UE. However, utilizing fixed values for $\Delta_1$ and $\Delta_2$ may reduce scheduling flexibility.

For certain aspects of the present disclosure, the following settings may place the two assigned PHICH resources in the same PHICH group with 90-degree phase difference on the associated orthogonal sequences as follows:

$$\Delta_1 = N_{SF}^{PHICH} \cdot N_{PHICH}^{group} \text{ and } \Delta_2 = 0.$$

Various options may be available with regard to the signaling of $\Delta_1$ and $\Delta_2$. For certain aspects of the present disclosure, values of $\Delta_1$ and $\Delta_2$ may be signaled implicitly. For example, the values of $\Delta_1$ and $\Delta_2$ may be derived from information that is already signaled in the DCI format. As an example, the values of $\Delta_1$ and $\Delta_2$ may be derived by utilizing the cyclic shift value for the DMRS of the second layer that are already signaled.

For certain aspects, $\Delta_1$ and $\Delta_2$ may be configured semi-statically by higher layers. For another aspect, $\Delta_1$ and $\Delta_2$ may be signaled dynamically in the corresponding DCI format. For example, one bit may be enough to select one out of two possible values for $\Delta_1$ and $\Delta_2$. In some scenarios, the same bit may be reused as a frequency hopping flag to avoid increase of DCI payload. The two possible values of $\Delta_1$ and $\Delta_2$ (e.g., the two possible values that are indicated using the one bit) can be either fixed or configurable by higher layers. It should be noted that, this option may avoid any collisions in PHICH.

Figure 5:
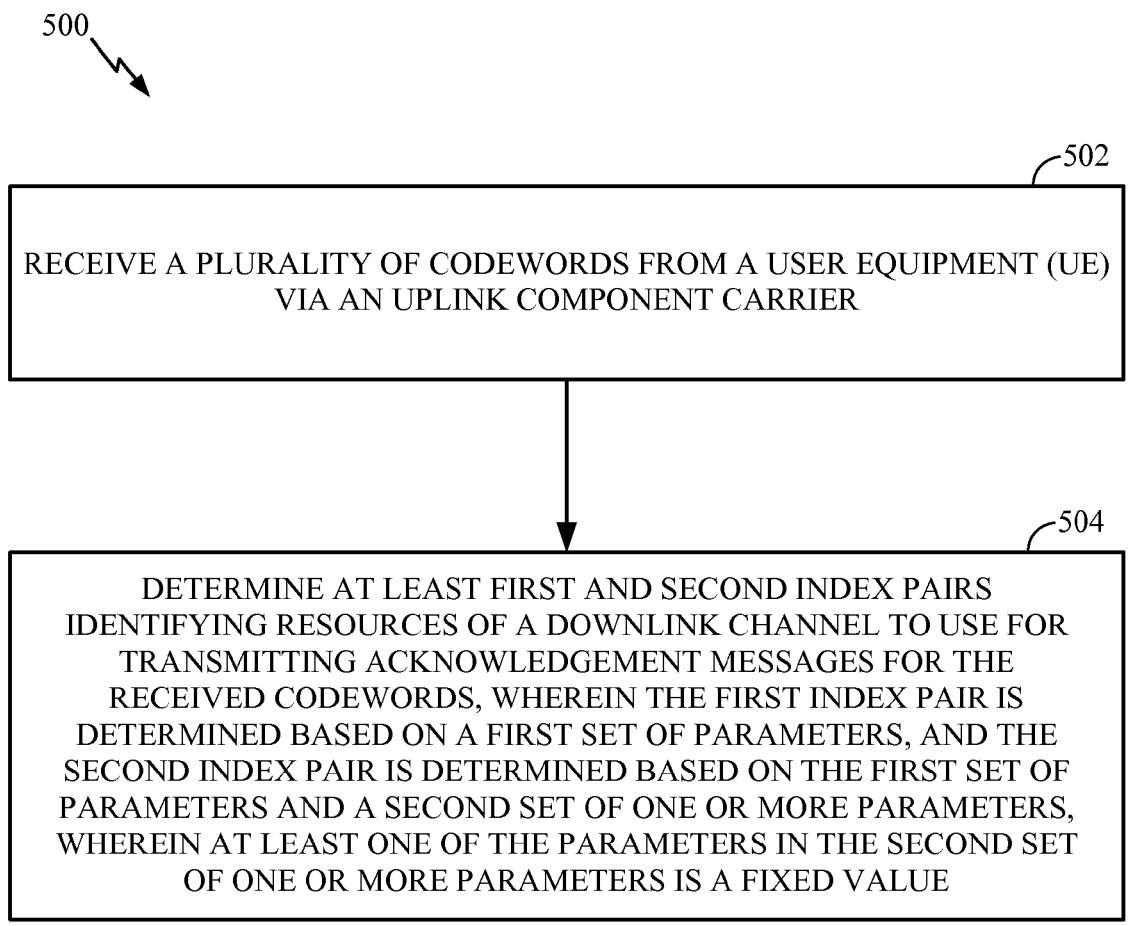
FIG. 5 illustrates operations that may be performed by an eNodeB in accordance with certain aspects of the present disclosure.

FIG. 5 illustrates example operations that may be performed by an eNodeB in accordance with certain aspects of the present disclosure.

The operations begin, at 502, with the eNodeB receiving a plurality of codewords from a UE via an uplink component carrier. At 504, the eNodeB determines at least first and second index pairs identifying resources of a downlink channel to use for transmitting acknowledgement messages for the received codewords. As an example, each pair may include a PHICH group number and a sequence index within the PHICH group.

The first index pair may be determined based on a first set of parameters, and the second index pair may be determined based on the first set of parameters and a second set of one or more parameters. As an example, the second set of parameters may be the $\Delta_1$ and $\Delta_2$ parameters described above and the first set of parameters may include $N_{SF}^{PHICH}$, $I_{PRB\_RA}^{lowest\_index}$, $N_{PHICH}^{group}$, and the like. Thus, the equations described above may be used to determine the resources to be used for communication between the eNodeB and the UE. At least one of the parameters in second set of one or more parameters may be a fixed value.

Figure 6:
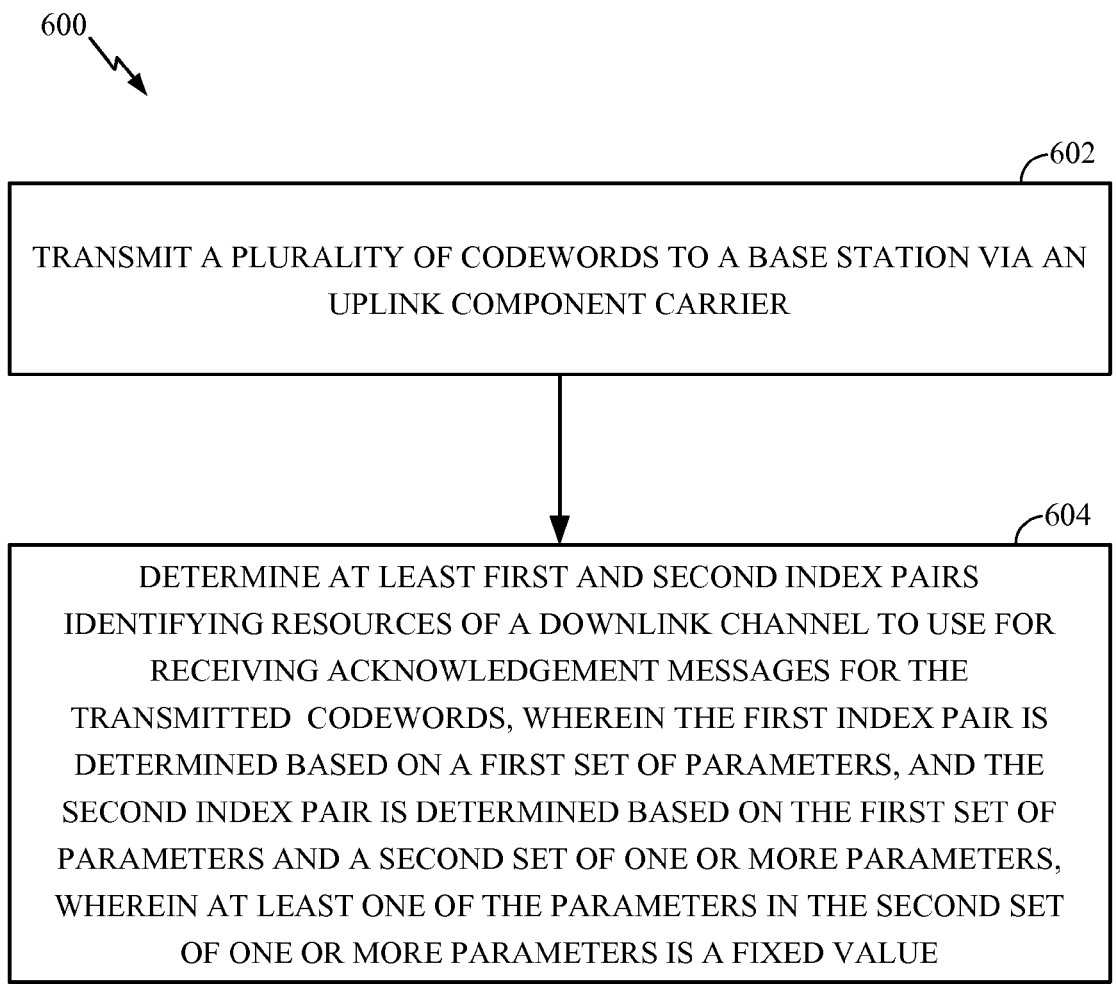
FIG. 6 illustrates operations that may be performed by a user equipment in accordance with certain aspects of the present disclosure.

FIG. 6 illustrates example operations that may be performed by a UE in accordance with certain aspects of the present disclosure.

The operations begin, at 602, with the UE transmits a plurality of codewords to a base station via an uplink component carrier. At 604, the UE determines at least first and second index pairs identifying resources of a downlink channel to use for receiving acknowledgement messages for the transmitted codewords.

As noted above, each pair may include a PHICH group number and a sequence index within the PHICH group. The first index pair may be determined based on a first set of parameters, and the second index pair may be determined based on the first set of parameters and a second set of one or more parameters. As an example, the second set of parameters may be the $\Delta_1$ and $\Delta_2$ parameters and the first set of parameters may include $N_{SF}^{PHICH}$, $I_{PRB\_RA}^{lowest\_index}$, $N_{PHICH}^{group}$, and the like. At least one of the parameters in the second set of one or more parameters may be a fixed value.

The various operations of methods described above may be performed by any suitable means capable of performing the corresponding functions. The means may include various hardware and/or software component(s) and/or module(s), including, but not limited to a circuit, an application specific integrate circuit (ASIC), or processor. The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The steps of a method or algorithm described in connection with the present disclosure may be embodied directly in hardware, in a software module executed by a processor, or in a combination of the two. The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, comprising:
receiving a plurality of codewords from a user equipment (UE) via an uplink component carrier; and
determining at least a first index pair and a second index pair for identifying resources of a downlink channel to use for transmitting acknowledgement messages for the received codewords,
the first index pair being determined based at least in part on a first set of parameters, the first set of parameters including a number for a demodulation reference signal (DMRS), a size of a spreading factor used for modulation in a physical hybrid automatic repeat request indicator channel (PHICH), a lowest index of physical resource blocks (PRBs) in a first slot of a corresponding physical uplink shared channel (PUSCH) transmission, a number of PHICH groups, and an index,
the second index pair being determined based on the first set of parameters, a first delta value, and a second delta value,
the first delta value and the second delta value being used for the second index pair and not being used for the first index pair, and the first delta value being different from the second delta value.

2. The method of claim 1, wherein each index pair includes a number of a channel group and a sequence index within the channel group, and the first delta value is defined as $\Delta_1$ and the second delta value is defined as $\Delta_2$, and
a channel group number for the first index pair is defined as $$n_{PHICH}^{group} = (I_{PRB\_RA}^{lowest\_index} + n_{DMRS}) \mod N_{PHICH}^{group} + I_{PHICH} N_{PHICH}^{group}$$

and a sequence index for the first index pair is defined as $$n_{PHICH}^{seq} = (\lfloor I_{PRB\_RA}^{lowest\_index} / N_{PHICH}^{group} \rfloor + n_{DMRS}) \mod 2 N_{SF}^{PHICH}, \text{ and}$$

a channel group number for the second index pair is defined as $$n_{PHICH}^{group} = ((I_{PRB\_RA}^{lowest\_index} + \Delta_1) + (n_{DMRS} + \Delta_2)) \mod N_{PHICH}^{group} + I_{PHICH} N_{PHICH}^{group}$$

and a sequence index for the second index pair is defined as $$n_{PHICH}^{seq} = (\lfloor (I_{PRB\_RA}^{lowest\_index} + \Delta_1) / N_{PHICH}^{group} \rfloor + (n_{DMRS} + \Delta_2)) \mod 2 N_{SF}^{PHICH},$$

wherein $n_{DMRS}$ represents the number for the demodulation reference signal (DMRS), $N_{SF}^{PHICH}$ represents the size of the spreading factor used for modulation in a physical hybrid automatic repeat request indicator channel (PHICH), $I_{PRB\_RA}^{lowest\_index}$ represents the lowest index of the physical resource blocks (PRBs) in the first slot of the corresponding physical uplink shared channel (PUSCH) transmission, $N_{PHICH}^{group}$ represents the number of PHICH groups, and $I_{PHICH}$ is the index.

3. The method of claim 2, wherein $\Delta_1$ is equal to one and $\Delta_2$ is equal to zero.

4. The method of claim 2, wherein the first index pair and the second index pair have a common channel group number, and have 90-degree phase difference in their sequence indices.

5. The method of claim 4, wherein $\Delta_1$ is equal to $N_{SF}^{PHICH} \cdot N_{PHICH}^{group}$, and $\Delta_2$ is equal to zero.

6. The method of claim 1, wherein the first delta value and the second delta value are derived from information signaled in a downlink control information (DCI) format.

7. The method of claim 1, wherein the first delta value and the second delta value are semi-statically configured by higher layers.

8. The method of claim 1, wherein the first delta value and the second delta value are dynamically signaled in a corresponding downlink control information (DCI) format.

9. A method for wireless communications, comprising:
transmitting a plurality of codewords to a base station via an uplink component carrier; and
determining at least a first index pair and a second index pair for identifying resources of a downlink channel to use for transmitting acknowledgement messages for the transmitted codewords,
the first index pair being determined based at least in part on a first set of parameters, the first set of parameters including a number for a demodulation reference signal (DMRS), a size of a spreading factor used for modulation in a physical hybrid automatic repeat request indicator channel (PHICH), a lowest index of physical resource blocks (PRBs) in a first slot of a corresponding physical uplink shared channel (PUSCH) transmission, a number of PHICH groups, and an index,
the second index pair being determined based on the first set of parameters, a first delta value, and a second delta value,
the first delta value and the second delta value being used for the second index pair and not being used for the first index pair, and the first delta value being different from the second delta value.

10. The method of claim 9, wherein each index pair includes a number of a channel group and a sequence index within the channel group, and the first delta value is defined as $\Delta_1$ and the second delta value is defined as $\Delta_2$, and
a channel group number for the first index pair is defined as $$n_{PHICH}^{group} = (I_{PRB\_RA}^{lowest\_index} + n_{DMRS}) \mod N_{PHICH}^{group} + I_{PHICH} N_{PHICH}^{group}$$

and a sequence index for the first index pair is defined as $$n_{PHICH}^{seq}=(\lfloor I_{PRB\_RA}^{lowest\_index}/N_{PHICH}^{group}\rfloor+n_{DMRS})\bmod 2N_{SF}^{PHICH}, \text{ and}$$

a channel group number for the second index pair is defined as $$n_{PHICH}^{group}=((I_{PRB\_RA}^{lowest\_index}+\Delta_1)+(n_{DMRS}+\Delta_2))\bmod N_{PHICH}^{group}+I_{PHICH}N_{PHICH}^{group}$$

and a sequence index for the second index pair is defined as $$n_{PHICH}^{seq}=(\lfloor (I_{PRB\_RA}^{lowest\_index}+\Delta_1)/N_{PHICH}^{group}\rfloor+(n_{DMRS}+\Delta_2))\bmod 2N_{SF}^{PHICH},$$

wherein $n_{DMRS}$ represents the number for the demodulation reference signal (DMRS), $N_{SF}^{PHICH}$ represents the size of the spreading factor used for modulation in a physical hybrid automatic repeat request indicator channel (PHICH), $I_{PRB\_RA}^{lowest\_index}$ represents the lowest index of the physical resource blocks (PRBs) in the first slot of the corresponding physical uplink shared channel (PUSCH) transmission, $N_{PHICH}^{group}$ represents the number of PHICH groups, and $I^{PHICH}$ is the index.

11. The method of claim 10, wherein $\Delta_1$ is equal to one and $\Delta_2$ is equal to zero.

12. The method of claim 10, wherein the first index pair and the second index pair have a common channel group number, and have 90-degree phase difference in their sequence indices.

13. The method of claim 12, wherein $\Delta_1$ is equal to $N_{SF}^{PHICH} \cdot N_{PHICH}^{group}$, and $\Delta_2$ is equal to zero.

14. The method of claim 9, wherein the first delta value and the second delta value are derived from information received in a downlink control information (DCI) format.

15. The method of claim 9, wherein the first delta value and the second delta value are semi-statically configured by higher layers.

16. The method of claim 9, wherein the first delta value and the second delta value are dynamically received in a corresponding downlink control information (DCI) format.

17. An apparatus for wireless communications, comprising:
means for receiving a plurality of codewords from a user equipment (UE) via an uplink component carrier; and
means for determining at least a first index pair and a second index pair for identifying resources of a downlink channel to use for transmitting acknowledgement messages for the received codewords,
the first index pair being determined based at least in part on a first set of parameters, the first set of parameters including a number for a demodulation reference signal (DMRS), a size of a spreading factor used for modulation in a physical hybrid automatic repeat request indicator channel (PHICH), a lowest index of physical resource blocks (PRBs) in a first slot of a corresponding physical uplink shared channel (PUSCH) transmission, a number of PHICH groups, and an index,
the second index pair being determined based on the first set of parameters, a first delta value, and a second delta value,
the first delta value and the second delta value being used for the second index pair and not being used for the first index pair, and the first delta value being different from the second delta value.

18. The apparatus of claim 17, wherein each index pair includes a number of a channel group and a sequence index within the channel group, and the first delta value is defined as $\Delta_1$ and the second delta value is defined as $\Delta_2$, and a channel group number for the first index pair is defined as $$n_{PHICH}^{group}=(I_{PRB\_RA}^{lowest\_index}+n_{DMRS})\bmod N_{PHICH}^{group}+I_{PHICH}N_{PHICH}^{group}$$

and a sequence index for the first index pair is defined as $$n_{PHICH}^{seq}=(\lfloor I_{PRB\_RA}^{lowest\_index}/N_{PHICH}^{group}\rfloor+n_{DMRS})\bmod 2N_{SF}^{PHICH}, \text{ and}$$

and a channel group number for the second index pair is defined as $$n_{PHICH}^{group}=((I_{PRB\_RA}^{lowest\_index}+\Delta_1)+(n_{DMRS}+\Delta_2))\bmod N_{PHICH}^{group}+I_{PHICH}N_{PHICH}^{group}$$

and a sequence index for the second index pair is defined as $$n_{PHICH}^{seq}=(\lfloor (I_{PRB\_RA}^{lowest\_index}+\Delta_1)/N_{PHICH}^{group}\rfloor+(n_{DMRS}+\Delta_2))\bmod 2N_{SF}^{PHICH},$$

wherein $n_{DMRS}$ represents the number for the demodulation reference signal (DMRS), $N_{SF}^{PHICH}$ represents the size of the spreading factor used for modulation in a physical hybrid automatic repeat request indicator channel (PHICH), $I_{PRB\_RA}^{lowest\_index}$ represents the lowest index of the physical resource blocks (PRBs) in the first slot of the corresponding physical uplink shared channel (PUSCH) transmission, $N_{PHICH}^{group}$ represents the number of PHICH groups, and $I_{PHICH}$ is the index.

19. The apparatus of claim 18, wherein $\Delta_1$ is equal to one and $\Delta_2$ is equal to zero.

20. The apparatus of claim 18, wherein the first index pair and the second index pair have a common channel group number, and have 90-degree phase difference in their sequence indices.

21. The apparatus of claim 20, wherein $\Delta_1$ is equal to $N_{SF}^{PHICH} \cdot N_{PHICH}^{group}$, and $\Delta_2$ is equal to zero.

22. The apparatus of claim 17, wherein the first delta value and the second delta value are derived from information signaled in a downlink control information (DCI) format.

23. The apparatus of claim 17, wherein the first delta value and the second delta value are semi-statically configured by higher layers.

24. The apparatus of claim 17, wherein the first delta value and the second delta value are dynamically signaled in a corresponding downlink control information (DCI) format.

25. An apparatus for wireless communications, comprising:
means for transmitting a plurality of codewords to a base station via an uplink component carrier; and
means for determining at least a first index pair and a second index pair for identifying resources of a downlink channel to use for transmitting acknowledgement messages for the transmitted codewords,
the first index pair being determined based at least in part on a first set of parameters, the first set of parameters including a number for a demodulation reference signal (DMRS), a size of a spreading factor used for modulation in a physical hybrid automatic repeat request indicator channel (PHICH), a lowest index of physical resource blocks (PRBs) in a first slot of a corresponding physical uplink shared channel (PUSCH) transmission, a number of PHICH groups, and an index,
the second index pair being determined based on the first set of parameters, a first delta value, and a second delta value, and
the first delta value and the second delta value being used for the second index pair and not being used for the first index pair, and the first delta value being different from the second delta value.

26. The apparatus of claim 25, wherein each index pair includes a number of a channel group and a sequence index within the channel group, and the first delta value is defined as $\Delta_1$ and the second delta value is defined as $\Delta_2$, and a channel group number for the first index pair is defined as $$n_{PHICH}^{group}=(I_{PRB\_RA}^{lowest\_index}+n_{DMRS})\bmod N_{PHICH}^{group}+I_{PHICH}N_{PHICH}^{group}$$

and a sequence index for the first index pair is defined as $$n_{PHICH}^{seq}=(\lfloor I_{PRB\_RA}^{lowest\_index}/N_{PHICH}^{group} \rfloor + n_{DMRS})\mod 2N_{SF}^{PHICH}, \text{ and}$$

and a channel group number for the second index pair is defined as $$n_{PHICH}^{group}=((I_{PRB\_RA}^{lowest\_index}+\Delta_1)+(n_{DMRS}+\Delta_2)) \mod N_{PHICH}^{group}+I_{PHICH}N_{PHICH}^{group}$$

and a sequence index for the second index pair is defined as $$n_{PHICH}^{seq}=(\lfloor (I_{PRB\_RA}^{lowest\_index}+\Delta_1)/N_{PHICH}^{group} \rfloor + (n_{DMRS}+\Delta_2))\mod 2N_{SF}^{PHICH},$$

wherein $n_{DMRS}$ represents the number for the demodulation reference signal (DMRS), $N_{SF}^{PHICH}$ represents the size of the spreading factor used for modulation in a physical hybrid automatic repeat request indicator channel (PHICH), $I_{PRB\_RA}^{lowest\_index}$ represents the lowest index of the physical resource blocks (PRBs) in the first slot of the corresponding physical uplink shared channel (PUSCH) transmission, $N_{PHICH}^{group}$ represents the number of PHICH groups, and $I_{PHICH}$ is the index.

27. The apparatus of claim 26, wherein $\Delta_1$ is equal to one and $\Delta_2$ is equal to zero.

28. The apparatus of claim 26, wherein the first index pair and the second index pair have a common channel group number, and have 90-degree phase difference in their sequence indices.

29. The apparatus of claim 28, wherein $\Delta_1$ is equal to $N_{SF}^{PHICH} \cdot N_{PHICH}^{group}$, and $\Delta_2$ is equal to zero.

30. The apparatus of claim 25, wherein the first delta value and the second delta value are derived from information received in a downlink control information (DCI) format.

31. The apparatus of claim 25, wherein the first delta value and the second delta value are semi-statically configured by higher layers.

32. The apparatus of claim 25, wherein the first delta value and the second delta value are dynamically received in a corresponding downlink control information (DCI) format.

33. An apparatus for wireless communications, comprising:
at least one processor configured:
to receive a plurality of codewords from a user equipment (UE) via an uplink component carrier, and
to determine at least a first index pair and a second index pair for identifying resources of a downlink channel to use for transmitting acknowledgement messages for the received codewords,
the first index pair being determined based at least in part on a first set of parameters, the first set of parameters including a number for a demodulation reference signal (DMRS), a size of a spreading factor used for modulation in a physical hybrid automatic repeat request indicator channel (PHICH), a lowest index of physical resource blocks (PRBs) in a first slot of a corresponding physical uplink shared channel (PUSCH) transmission, a number of PHICH groups, and an index,
the second index pair being determined based on the first set of parameters, a first delta value, and a second delta value,
the first delta value and the second delta value being used for the second index pair and not being used for the first index pair, and the first delta value being different from the second delta value; and
a memory coupled with the at least one processor.

34. The apparatus of claim 33, wherein each index pair includes a number of a channel group and a sequence index within the channel group, and the first delta value is defined as $\Delta_1$ and the second delta value is defined as $\Delta_2$, and a channel group number for the first index pair is defined as $$n_{PHICH}^{group}=(I_{PRB\_RA}^{lowest\_index}+n_{DMRS}) \mod N_{PHICH}^{group}+I_{PHICH}N_{PHICH}^{group}$$

and a sequence index for the first index pair is defined as $$n_{PHICH}^{seq}=(\lfloor I_{PRB\_RA}^{lowest\_index}/N_{PHICH}^{group} \rfloor + n_{DMRS})\mod 2N_{SF}^{PHICH}, \text{ and}$$

and a channel group number for the second index pair is defined as $$n_{PHICH}^{group}=((I_{PRB\_RA}^{lowest\_index}+\Delta_1)+(n_{DMRS}+\Delta_2)) \mod N_{PHICH}^{group}+I_{PHICH}N_{PHICH}^{group}$$

and a sequence index for the second index pair is defined as $$n_{PHICH}^{seq}=(\lfloor (I_{PRB\_RA}^{lowest\_index}+\Delta_1)/N_{PHICH}^{group} \rfloor + (n_{DMRS}+\Delta_2))\mod 2N_{SF}^{PHICH},$$

wherein $n_{DMRS}$ represents the number for the demodulation reference signal (DMRS), $N_{SF}^{PHICH}$ represents the size of the spreading factor used for modulation in a physical hybrid automatic repeat request indicator channel (PHICH), $I_{PRB\_RA}^{lowest\_index}$ represents the lowest index of the physical resource blocks (PRBs) in the first slot of the corresponding physical uplink shared channel (PUSCH) transmission, $N_{PHICH}^{group}$ represents the number of PHICH groups, and $I_{PHICH}$ is the index.

35. The apparatus of claim 34, wherein $\Delta_1$ is equal to one and $\Delta_2$ is equal to zero.

36. An apparatus for wireless communications, comprising:
at least one processor configured:
to transmit a plurality of codewords to a base station via an uplink component carrier, and
to determine at least a first index pair and a second index pair for identifying resources of a downlink channel to use for transmitting acknowledgement messages for the transmitted codewords,
the first index pair being determined based at least in part on a first set of parameters, the first set of parameters including a number for a demodulation reference signal (DMRS), a size of a spreading factor used for modulation in a physical hybrid automatic repeat request indicator channel (PHICH), a lowest index of physical resource blocks (PRBs) in a first slot of a corresponding physical uplink shared channel (PUSCH) transmission, a number of PHICH groups, and an index,
the second index pair being determined based on the first set of parameters, a first delta value, and a second delta value,
the first delta value and the second delta value being used for the second index pair and not being used for the first index pair, and the first delta value being different from the second delta value; and
a memory coupled with the at least one processor.

37. The apparatus of claim 36, wherein each index pair includes a number of a channel group and a sequence index within the channel group, and the first delta value is defined as $\Delta_1$ and the second delta value is defined as $\Delta_2$, and a channel group number for the first index pair is defined as $$n_{PHICH}^{group}=(I_{PRB\_RA}^{lowest\_index}+n_{DMRS}) \mod N_{PHICH}^{group}+I_{PHICH}N_{PHICH}^{group}$$

and a sequence index for the first index pair is defined as $$n_{PHICH}^{seq}=(\lfloor I_{PRB\_RA}^{lowest\_index}/N_{PHICH}^{group} \rfloor + n_{DMRS})\mod 2N_{SF}^{PHICH}, \text{ and}$$

and a channel group number for the second index pair is defined as $$n_{PHICH}^{group}=((I_{PRB\_RA}^{lowest\_index}+\Delta_1)+(n_{DMRS}+\Delta_2)) \bmod N_{PHICH}^{group}+I_{PHICH}N_{PHICH}^{group}$$

and a sequence index for the second index pair is defined as $$n_{PHICH}^{seq}=(\lfloor(I_{PRB\_RA}^{lowest\_index}+\Delta_1)/N_{PHICH}^{group}\rfloor+(n_{DMRS}+\Delta_2))\bmod 2N_{SF}^{PHICH},$$

wherein $n_{DMRS}$ represents the number for the demodulation reference signal (DMRS), $N_{SF}^{PHICH}$ represents the size of the spreading factor used for modulation in a physical hybrid automatic repeat request indicator channel (PHICH), $I_{PRB\_RA}^{lowest\_index}$ represents the lowest index of the physical resource blocks (PRBs) in the first slot of the corresponding physical uplink shared channel (PUSCH) transmission, $N_{PHICH}^{group}$ represents the number of PHICH groups, and $I_{PHICH}$ is the index.

38. The apparatus of claim 37, wherein $\Delta_1$ is equal to one and $\Delta_2$ is equal to zero.

39. A computer program product for wireless communication, the computer program product comprising:
a non-transitory computer-readable medium having program code recorded thereon, the program code comprising:
program code to receive a plurality of codewords from a user equipment (UE) via an uplink component carrier; and
program code to determine at least a first index pair and a second index pair for identifying resources of a downlink channel to use for transmitting acknowledgement messages for the received codewords,
the first index pair being determined based at least in part on a first set of parameters, the first set of parameters including a number for a demodulation reference signal (DMRS), a size of a spreading factor used for modulation in a physical hybrid automatic repeat request indicator channel (PHICH), a lowest index of physical resource blocks (PRBs) in a first slot of a corresponding physical uplink shared channel (PUSCH) transmission, a number of PHICH groups, and an index,
the second index pair being determined based on the first set of parameters, a first delta value, and a second delta value,
the first delta value and the second delta value being used for the second index pair and not being used for the first index pair, and the first delta value being different from the second delta value.

40. A computer program product for wireless communication, the computer program product comprising:
a non-transitory computer-readable medium having program code recorded thereon, the program code comprising:
program code to transmit a plurality of codewords to a base station via an uplink component carrier; and
program code to determine at least a first index pair and a second index pair for identifying resources of a downlink channel to use for transmitting acknowledgement messages for the transmitted codewords,
the first index pair being determined based at least in part on a first set of parameters, the first set of parameters including a number for a demodulation reference signal (DMRS), a size of a spreading factor used for modulation in a physical hybrid automatic repeat request indicator channel (PHICH), a lowest index of physical resource blocks (PRBs) in a first slot of a corresponding physical uplink shared channel (PUSCH) transmission, a number of PHICH groups, and an index,
the second index pair being determined based on the first set of parameters, a first delta value, and a second delta value,
the first delta value and the second delta value being used for the second index pair and not being used for the first index pair, and the first delta value being different from the second delta value.

\* \* \* \* \*